(12) United States Patent
Yang et al.

(10) Patent No.: US 9,781,567 B2
(45) Date of Patent: Oct. 3, 2017

(54) METHOD FOR PERFORMING A PROXIMITY SERVICE AND USER EQUIPMENT

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/282,717

(22) Filed: Sep. 30, 2016

(65) Prior Publication Data

US 2017/0099581 A1    Apr. 6, 2017

Related U.S. Application Data

(60) Provisional application No. 62/236,158, filed on Oct. 2, 2015, provisional application No. 62/236,983, filed on Oct. 5, 2015, provisional application No. 62/252,558, filed on Nov. 8, 2015.

(51) Int. Cl.
| | | |
|---|---|---|
| *H04W 36/00* | (2009.01) | |
| *H04W 4/02* | (2009.01) | |
| *H04W 8/00* | (2009.01) | |
| *H04W 36/14* | (2009.01) | |
| *H04W 72/04* | (2009.01) | |
| *H04W 84/04* | (2009.01) | |

(52) U.S. Cl.
CPC ............ *H04W 4/023* (2013.01); *H04W 8/005* (2013.01); *H04W 36/14* (2013.01); *H04W 72/0413* (2013.01); *H04W 84/042* (2013.01)

(58) Field of Classification Search
CPC ..... H04W 4/023; H04W 8/005; H04W 36/14; H04W 72/0413; H04W 84/042; H04W 24/10; H04W 74/10; H04W 72/1289; H04L 12/413; H04L 1/00
USPC .................. 455/444, 436; 370/329, 312, 280
See application file for complete search history.

(56) References Cited

U.S. PATENT DOCUMENTS

| | | | | |
|---|---|---|---|---|
| 9,374,699 B2* | 6/2016 | Liao | ......................... | H04W 8/04 |
| 9,479,342 B2* | 10/2016 | Wu | ..................... | H04L 12/1485 |
| 2009/0067448 A1* | 3/2009 | Stanwood | ............. | H04L 12/413 |
| | | | | 370/447 |

(Continued)

*Primary Examiner* — Mahendra Patel
(74) *Attorney, Agent, or Firm* — Lee, Hong, Degerman, Kang & Waimey

(57) ABSTRACT

One disclosure of the present specification provides a method for performing a proximity service (ProSe). The method may be performed by a user equipment (UE) and comprise: performing, by the UE configured with a primary cell (Pcell) and a secondary cell (Scell), a switching between the ProSe and a cellular service with at least one of the Pcell and the Scell; transceiving a ProSe discovery signal with at least one or more adjacent UEs after performing a switching from the cellular service to the ProSe service; and transceiving a signal with the at least one of the Pcell and the Scell after performing a switching from the ProSe service to the cellular service. Here, the UE is allowed an interruption of up to one subframe that is N subframes before and after an uplink (UL) subframe configured for transmitting the ProSe discovery signal.

8 Claims, 13 Drawing Sheets

(56) References Cited

U.S. PATENT DOCUMENTS

| | | | | |
|---|---|---|---|---|
| 2012/0287800 | A1* | 11/2012 | Siomina | G01S 5/0205 370/252 |
| 2013/0183970 | A1* | 7/2013 | Chen | H04W 36/30 455/436 |
| 2013/0322260 | A1* | 12/2013 | Yao | H04W 72/082 370/241 |
| 2014/0133428 | A1* | 5/2014 | Kazmi | H04W 24/02 370/329 |
| 2014/0192687 | A1* | 7/2014 | Kim | H04L 5/001 370/280 |
| 2015/0085719 | A1* | 3/2015 | Yin | H04L 1/1896 370/280 |
| 2015/0264662 | A1* | 9/2015 | Sahlin | H04W 72/1289 370/280 |
| 2016/0044744 | A1* | 2/2016 | Lee | H04W 16/32 370/329 |
| 2016/0278152 | A1* | 9/2016 | Lei | H04W 76/023 |
| 2016/0338022 | A1* | 11/2016 | Choi | H04W 72/12 |
| 2017/0013630 | A1* | 1/2017 | Franz | H04L 5/00 |

* cited by examiner

METHOD FOR PERFORMING A PROXIMITY SERVICE AND USER EQUIPMENT

CROSS-REFERENCE TO RELATED APPLICATION

Pursuant to 35 U.S.C. §119(e), this application claims benefit of U.S. Provisional Applications Nos. 62/236,158, filed on Oct. 2, 2015, 62/236,983, filed on Oct. 5, 2015 and 62/252,558, filed on Nov. 8, 2015, the contents of which are all hereby incorporated reference herein in their entirety.

BACKGROUND OF THE INVENTION

Field of the Invention
The present invention relates to mobile communication.
Related Art
3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, communication between UEs which are physically closed to each other, that is, device to device (D2D) communication) is required due to an increase in user requirements for a social network service (SNS).

The D2D communication may be called a proximity service (ProSe). In addition, a UE that performs the proximity service may be called a ProSe UE. In addition, a link between the UEs used in the D2D communication may be called a sidelink.

Meanwhile, UE should adjust or switch an RF chain of a transceiver in order to perform D2D communication. According to the above switching, cellular communication (or WAN communication) with a base station should temporarily interrupt. However, no researches and studies have been performed toward the temporary interruption up to now. Further, there is no discussion how long the temporary interruption is allowed up to now.

SUMMARY OF THE INVENTION

Accordingly, an object of the present invention is to solve the above-mentioned problems.

To achieve the foregoing object, one disclosure of the present specification provides a method for performing a proximity service (ProSe). The method may be performed by a user equipment (UE) and comprise: performing, by the UE configured with a primary cell (Pcell) and a secondary cell (Scell), a switching between the ProSe and a cellular service with at least one of the Pcell and the Scell; transceiving a ProSe discovery signal with at least one or more adjacent UEs after performing a switching from the cellular service to the ProSe service; and transceiving a signal with the at least one of the Pcell and the S cell after performing a switching from the ProSe service to the cellular service. Here, the UE is allowed an interruption of up to one subframe that is N subframes before and after an uplink (UL) subframe configured for transmitting the ProSe discovery signal.

The interruption may occur with respect to the Scell while performing the switching between the ProSe and the cellular service with the Pcell.

The interruption may occur with respect to the Pcell and another Scell while performing the switching between the ProSe and the cellular service with the Scell.

If the UE includes a dedicated radio frequency (RF) chain for the ProSe discovery signal, the interruption may occur with respect to the Pcell and the Scell.

To achieve the foregoing object, one disclosure of the present specification also provides a user equipment (UE) for performing a proximity service (ProSe). The UE may comprise: a transceiver configured with a primary cell (Pcell) and a secondary cell (Scell); and a processor configured to: perform a switching between the ProSe and a cellular service with at least one of the Pcell and the Scell; transceive a ProSe discovery signal with at least one or more adjacent UEs after performing a switching from the cellular service to the ProSe service; and transceive a signal with the at least one of the Pcell and the Scell after performing a switching from the ProSe service to the cellular service. Here, the UE is allowed an interruption of up to one subframe that is N subframes before and after an uplink (UL) subframe configured for transmitting the ProSe discovery signal.

According to the disclosure of the present invention, the foregoing problem of the conventional technology is solved.

DESCRIPTION OF EXEMPLARY EMBODIMENTS

Figure 1:
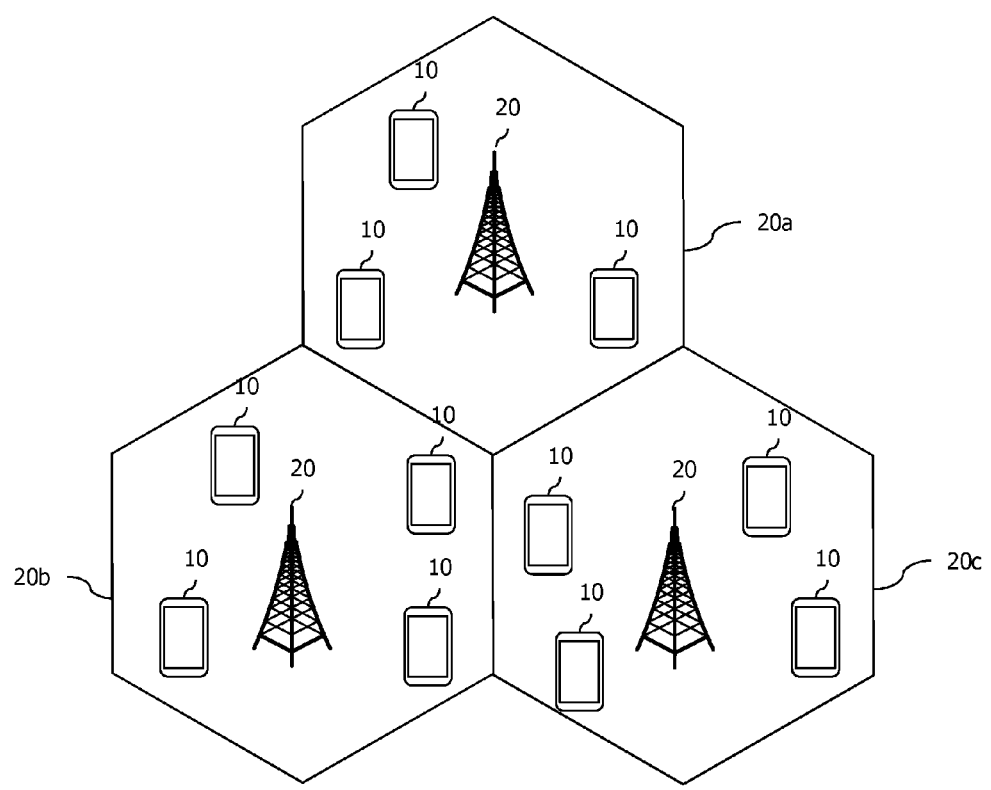
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Operating bands used in the wireless communication system are described below.

TABLE 1

| E-UTRA Operating Band | Uplink (UL) operating band FUL_low- FUL_high | Downlink (DL) operating band FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |

TABLE 1-continued

| E-UTRA Operating Band | Uplink (UL) operating band FUL_low- FUL_high | Downlink (DL) operating band FDL_low-FDL_high | Duplex Mode |
|---|---|---|---|
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Herein, $F_{UL\_low}$ means a lowest frequency of the uplink operating band. In addition, $F_{UL\_high}$ means a highest frequency of the uplink operating band. Further, $F_{UL\_low}$ means a lowest frequency of the downlink operating band. Besides, $F_{UL\_high}$ means a highest frequency of the downlink operating band.

In addition, the bands are grouped as below.

TABLE 2

| | E-UTRA FDD | | E-UTRA TDD | |
|---|---|---|---|---|
| Group | Band group name | Operating band | Band group name | Operating band |
| A | FDD_A | 1, 4, 6, 10, 11, 18, 19, 21, 23, 24, 32, 67 | TDD_A | 33, 34, 35, 36, 37, 38, 39, 40, 45 |
| B | FDD_B | 65, 66 | TDD_B | — |
| C | FDD_C | 9, 30 | TDD_C | 42, 43 |
| D | FDD_D | 28 | TDD_D | — |
| E | FDD_E | 2, 5, 7, 27 | TDD_E | 41, 44 |
| F | FDD_F | 26 | TDD_F | — |
| G | FDD_G | 3, 8, 12, 13, 14, 17, 20, 22, 29 | TDD_G | — |
| H | FDD_H | 25 | TDD_H | — |
| I | FDD_I | — | TDD_I | — |
| J | FDD_J | — | TDD_J | — |
| K | FDD_K | — | TDD_K | — |
| L | FDD_L | — | TDD_L | — |
| M | FDD_M | — | TDD_M | — |
| N | FDD_N | 31 | TDD_N | — |

Hereinafter, the LTE system will be described in detail.

Figure 2:
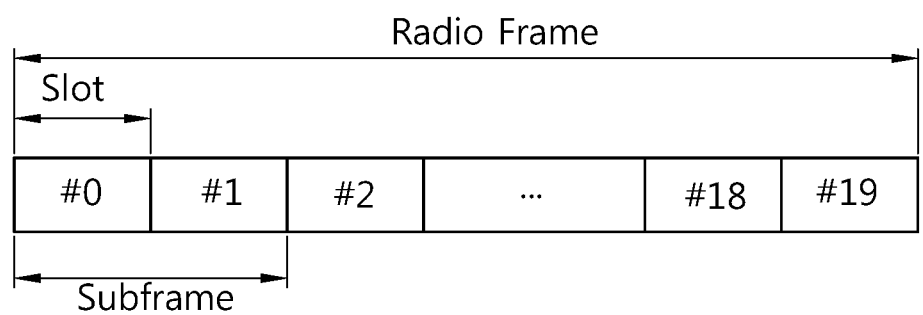
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
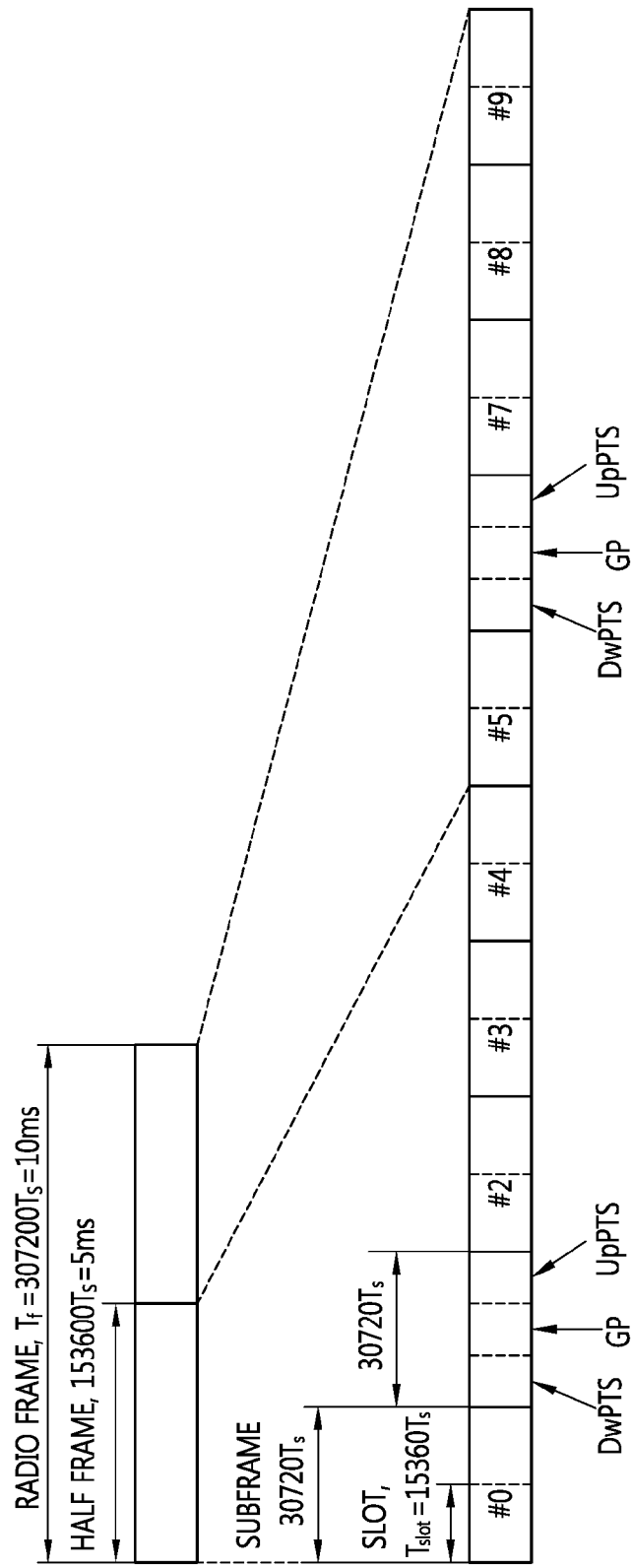
FIG. 3 illustrates a structure of a downlink radio frame according to TDD in the 3GPP LTE.

FIG. 3 illustrates the architecture of a downlink radio frame according to TD D in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 3 shows an example of configuration of a radio frame.

TABLE 3

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 4

| | Normal CP in downlink | | | Extended CP in downlink | | |
|---|---|---|---|---|---|---|
| | | UpPTS | | | UpPTS | |
| Special sub-frame config- uration | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*Ts |

TABLE 4-continued

| | Normal CP in downlink | | | Extended CP in downlink | | |
|---|---|---|---|---|---|---|
| Special sub-frame config-uration | DwPTS | UpPTS | | DwPTS | UpPTS | |
| | | Normal CP in uplink | Ex-tended CP in uplink | | Normal CP in uplink | Ex-tended CP in uplink |
| 5 | 6592*Ts | 4384*Ts | 5120*Ts | 20480*Ts | | |
| 6 | 19760*Ts | | | 23040*Ts | | |
| 7 | 21952*Ts | | | — | | |
| 8 | 24144*Ts | | | — | | |

Figure 4:
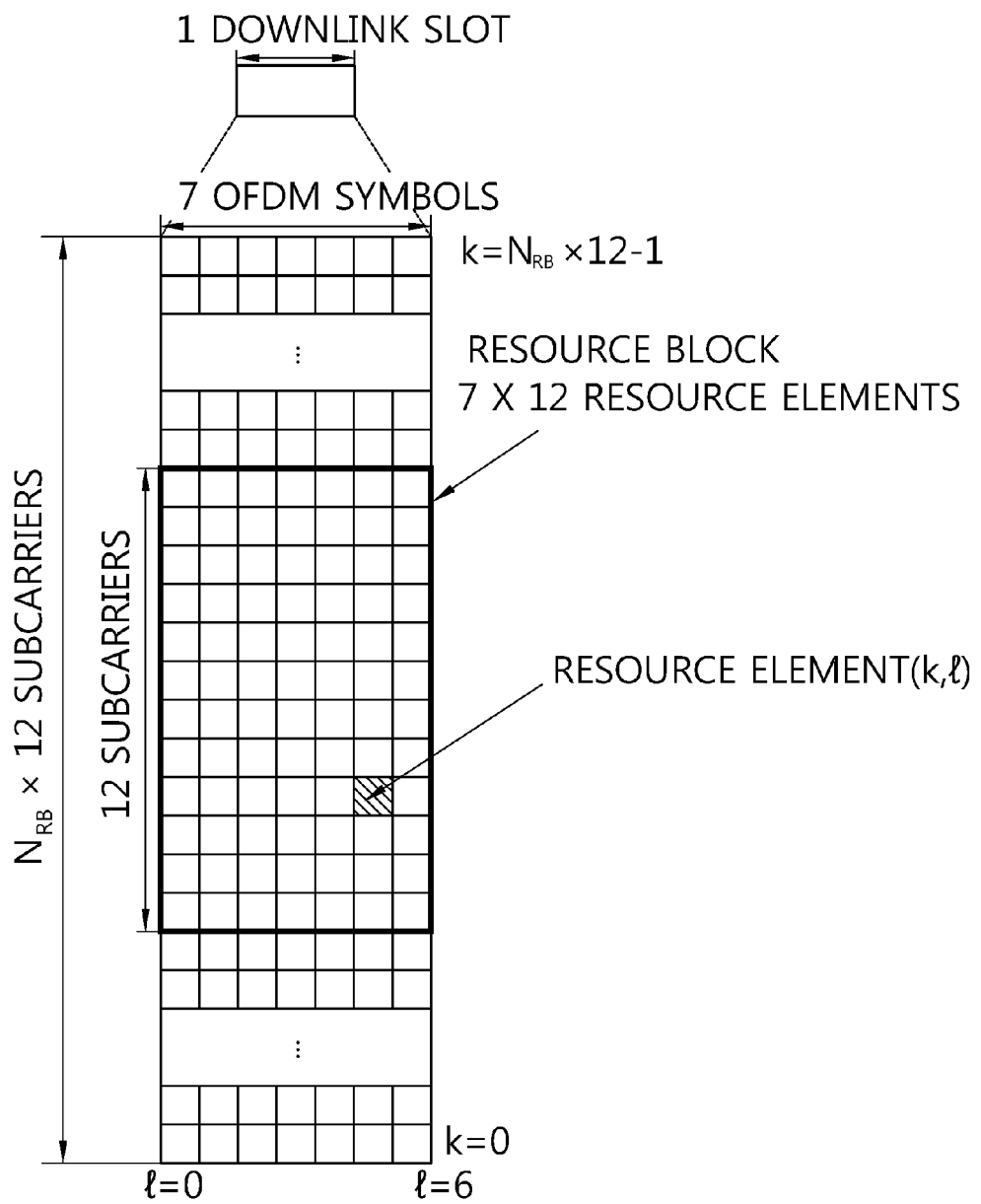
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
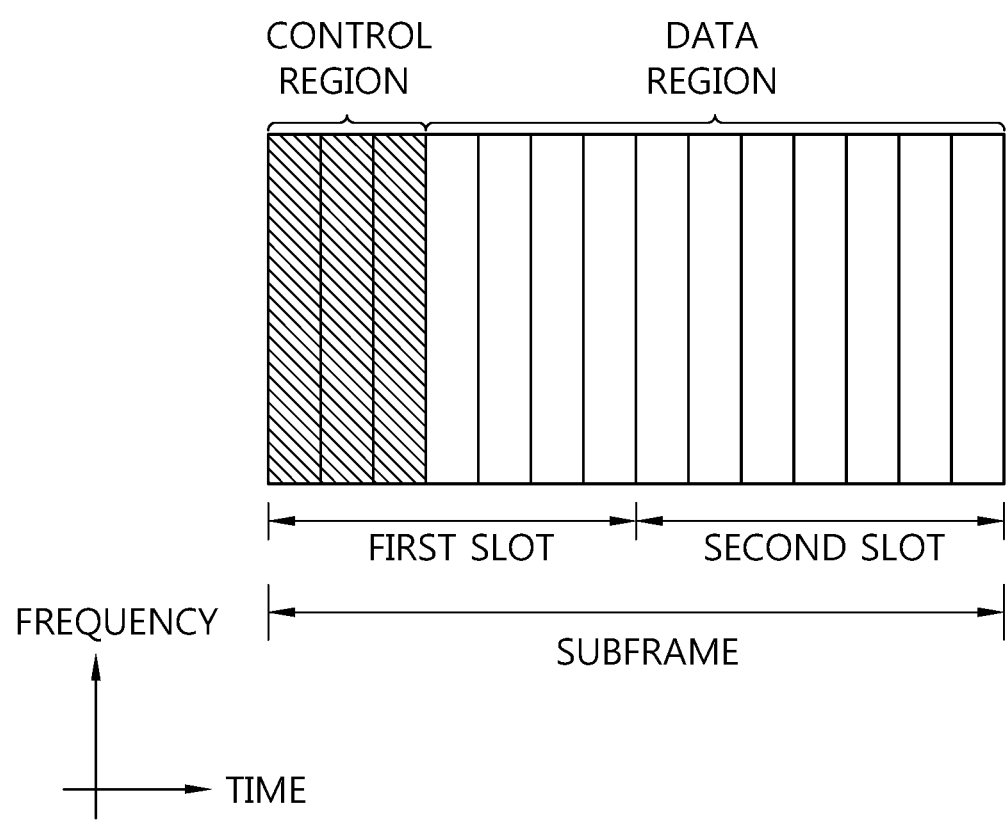
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
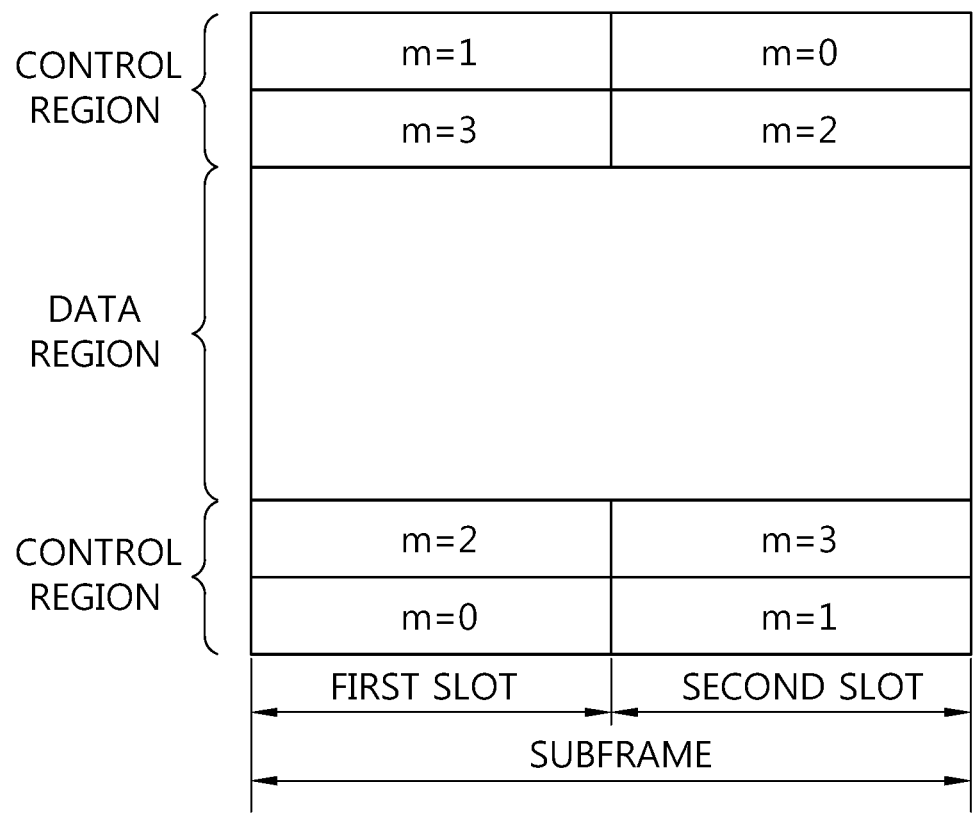
FIG. 6. illustrates a structure of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Discontinuous Reception (DRX)>

Now, DRX will be described.

The discontinuous reception (DRX) is a technique that allows the terminal to discontinuously monitor the downlink channel to reduce battery consumption. When the DRX is set, the terminal discontinuously monitors the downlink channel. If not, the terminal continuously monitors the downlink channel.

In recent years, a lot of applications require an always-on characteristic. Always-on represents a characteristic that the terminal always accesses the network, and as a result, the terminal may immediately transmit data as necessary.

However, when the terminal continuously maintains the network access, the battery consumption is heavy, and as a result, setting the DRX appropriate to the corresponding application may guarantee the always-on characteristic while reducing the battery consumption.

Figure 7:
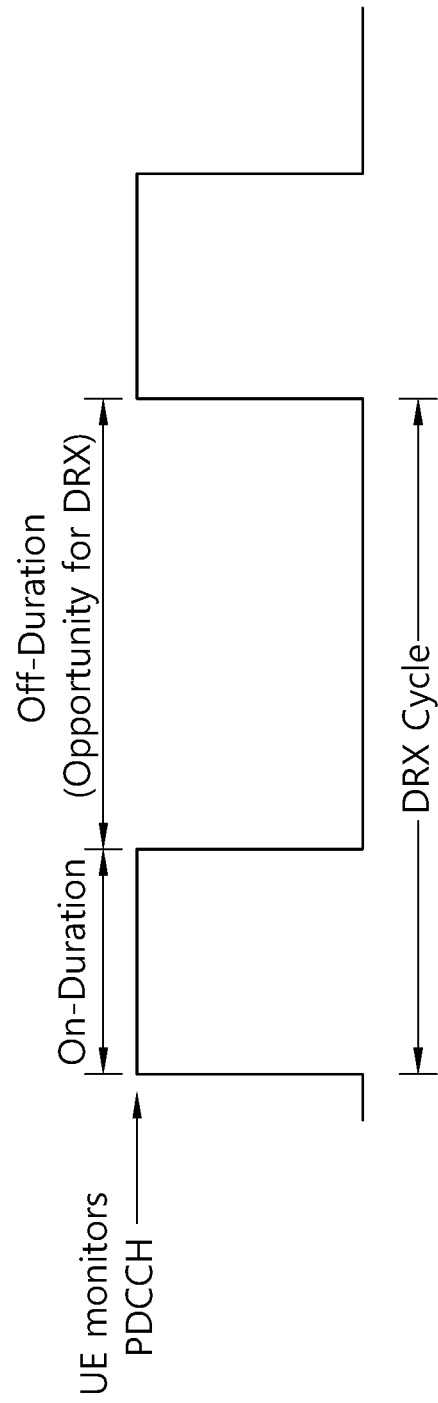
FIG. 7 illustrates a DRX cycle.

FIG. 7 illustrates a DRX cycle.

The DRX cycle specifies periodic repetition of on-duration in which an available period of inactivity is continued. The DRX cycle includes an on-period and an off-period. The on-period is a period in which the terminal monitors the PDCCH within the DRX cycle.

When the DRX is set, the terminal may monitor the PDCCH only during the on-period and not monitor the PDCCH during the off-period.

An on-duration timer is used to define the on-period. The on-duration may be defined as a period in which the onDuration timer operates. The onDuration timer specifies the number of continuous PDCCH-subframes at a start time of the DRX cycle. The PDCCH-subframe indicates a subframe in which the PDCCH is monitored.

Except for the DRX cycle, a period in which the PDCCH is monitored may be further defined. The period in which the PDCCH is monitored is collectively named to be defined as an active time.

A drx-Inactivity timer deactivates the DRX. When the drx-Inactivity timer operates, the terminal continuously monitors the PDCCH regardless of the DRX cycle. The drx-Inactivity timer starts when an initial UL grant or DL grant is received on the PDCCH. The drx-Inactivity timer may specify the number of continuous PDCCH-subframes after successfully decoding the PDCCH indicating initial UL or DL user data transmission for corresponding UE.

An HARQ RTT timer defines a minimum period in which the terminal anticipates DL HARQ retransmission. The HARQ RTT timer may specify a minimum quantity mount of subframes before the DL HARQ retransmission anticipated by the terminal.

A drx-Retransmission timer defines a period in which the PDCCH is monitored while the terminal anticipates DL retransmission. The drx-Retransmission timer may specify the maximum number of continuous PDCCH-subframes just after the DL retransmission is anticipated by the terminal. After initial DL transmission, the terminal drives the HARQ RTT timer. When an error is discovered with respect to the initial DL transmission, the terminal transmits an NACK to a base station, stops the HARQ RTT timer, and drives the drx-Retransmission timer. The terminal monitors the PDCCH for the DL retransmission from the base station while the drx-Retransmission timer operates.

The active time may include an on-period in which the PDCCH is periodically monitored and a period in which the PDCCH is monitored due to occurrence of an event.

When the DRX cycle is set, the active time may include the following time.

onDuration timer, drx-Inactivity timer, drx-Retransmission timer and/or mac-ContentionResolution timer which starts;

A time when a scheduling request is transmitted onto the PUCCH and is pended;

A time when the UL grant for the HARQ retransmission which is pended may occur and data is present in a corresponding HARQ buffer;

A time when a PDCCH indicating new transmission toward a C-RNTI of the terminal is not received after a random access response for a preamble selected by the terminal is successfully received.

Figure 8:
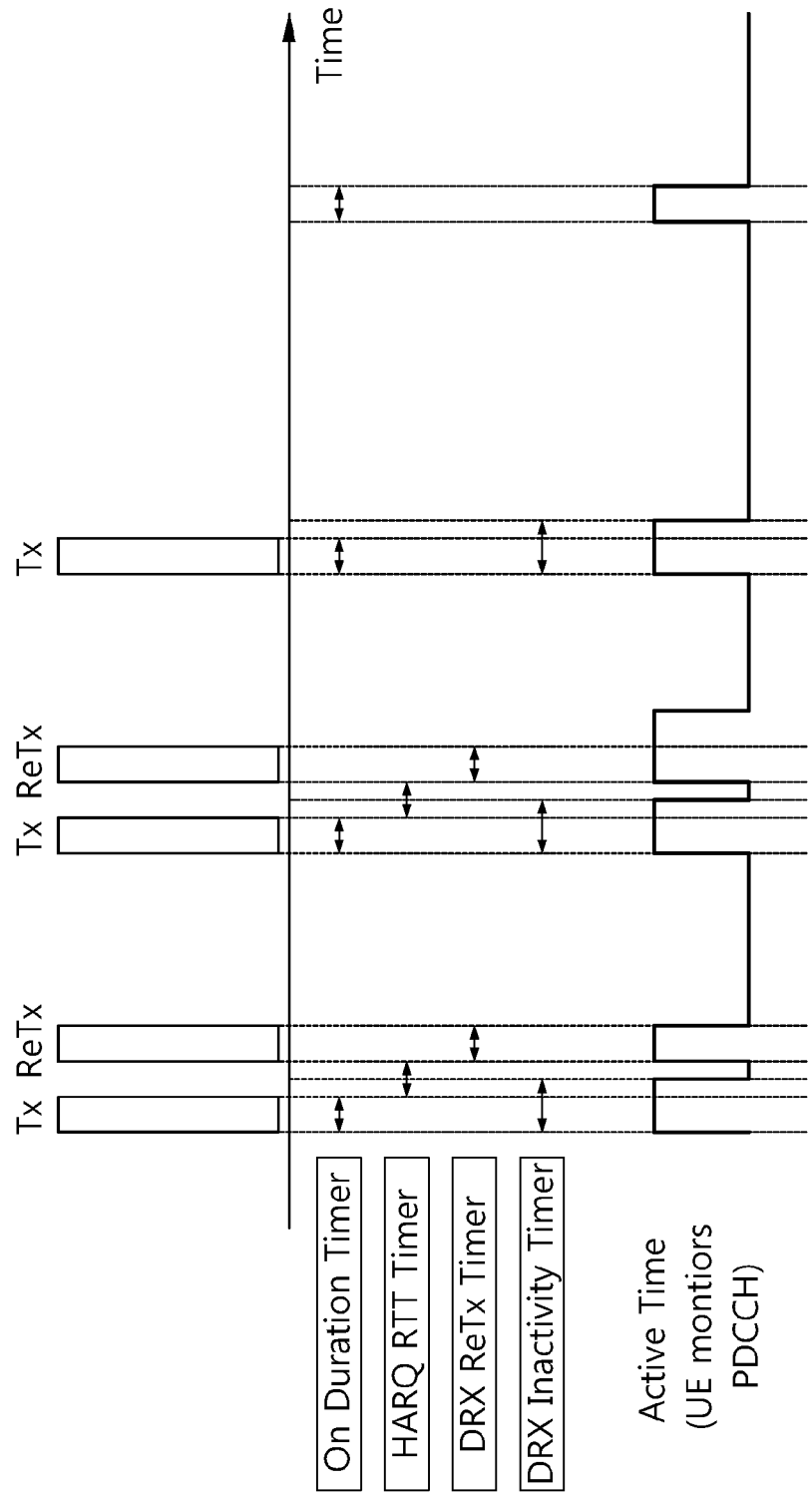
FIG. 8 illustrates an active time in the 3GPP LTE.

FIG. 8 illustrates an active time in the 3GPP LTE.

When the DRX is set, the terminal needs to perform the following operation with respect to each subframe.

When the HARQ RTT timer is expired in the subframe and data of a corresponding HARQ process is not successfully decoded:

The drx-Retransmission for the corresponding HARQ process starts.

When a DRX command MAC control element (CE) is received:

The onDuration timer and the drx-Inactivity timer stop.

When the drx-Inactivity timer is expired or the DRX Command MAC CE is received in the subframe:

When a short DRX cycle is set: A drx-shortcycle timer starts or restarts and the short DRX cycle is used.

If not: a long DRX cycle is used.

When the drx-shortcycle timer is expired in the subframe: the long DRX cycle is used.

When the short DRX cycle is used and [(SFN*10)+ subframe number] modulo (shortDRX-Cycle)=(drx-StartOffset) modulo (shortDRX-Cycle) is satisfied; or When the long DRX cycle is used and [(SFN*10)+ subframe number] modulo (longDRX-Cycle)=drxStartOffset is satisfied:
The onDuration timer starts.
When during the active time, the subframe is not required for the UL transmission for a half-duplex FDD terminal operation with respect to the PDCCH-subframe and the subframe is not a part of a configured measurement gap:
the PDCCH is monitored;
When the PDCCH indicates the DL transmission or DL allocation is configured with respect to the subframe:
The HARQ RTT timer for the corresponding HARQ process starts;
The drx-Retransmission for the corresponding HARQ process stops.
When the PDCCH indicates new (DL or UL) transmission:
The drx-Inactivity timer starts or restarts.

The DRX cycle includes two types of the long DRX cycle and the short DRX cycle. The long DRX cycle of a long period may minimize the battery consumption of the terminal and the short DRX cycle of a short period may minimize a data transmission delay.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

<Device to Device (D2D) Communication>

On the other hand, hereinafter, the D2D communication expected to be introduced in a next-generation communication system will be described.

Figure 9:
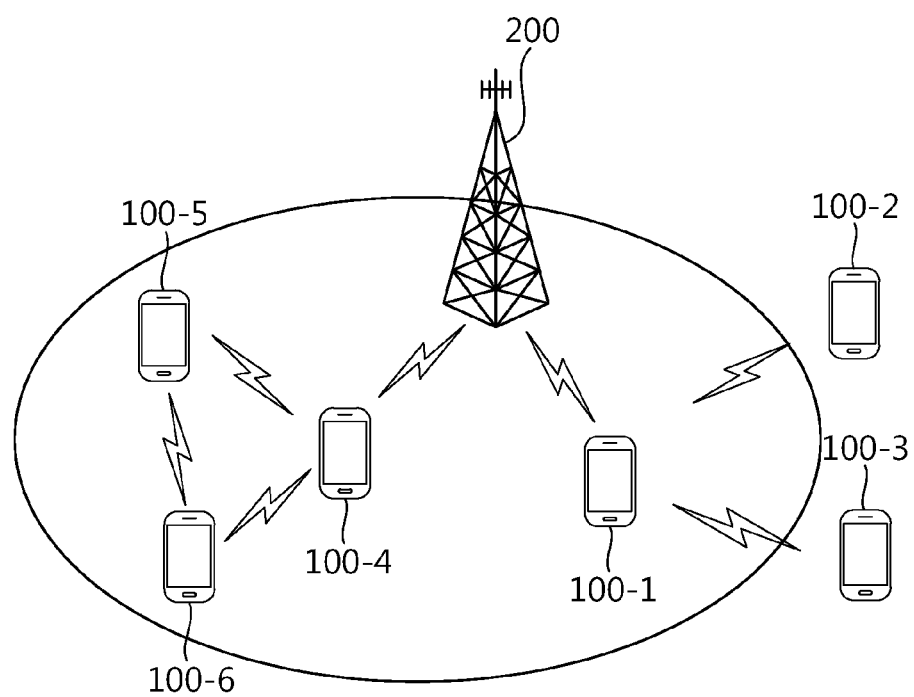
FIG. 9 illustrates a concept of device to device (D2D) communication expected to be introduced in a next-generation communication system.

FIG. 9 illustrates a concept of device to device (D2D) communication expected to be introduced in a next-generation communication system.

Communication between UEs which are physically closed to each other, that is, device to device (D2D) communication) is required due to an increase in user requirements for a social network service (SNS).

In order to reflect the aforementioned requirements, as illustrated in FIG. 9, a scheme that allows the UE#1 100-1, the UE#2 100-2, and the UE#3 100-3 or the UE#4 100-4, the UE#5 100-5, and the UE#6 100-6 to directly communicate with each other without intervention of a base station (eNodeB) 200 is discussed. Of course, the UE#1 100-1 and the UE#4 100-4 may directly communicate with each other under a help of the base station (eNodeB) 200. Meanwhile, the UE#1 100-1 may serve as a relay for the UE#2 100-2 and the UE#3 100-3.

Meanwhile, the D2D communication may be called a proximity service (ProSe). In addition, a UE that performs the proximity service may be called a ProSe UE. Moreover, a link between the UEs used in the D2D communication may be called a sidelink. Frequency bands which may be used for the sidelink are described below.

TABLE 5

| Sidelink band | E-UTRA band | Transmission $F_{UL\_low}$-$F_{UL\_high}$ | Reception $F_{DL\_low}$-$F_{DL\_high}$ | Duplex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |

TABLE 5-continued

| Sidelink band | E-UTRA band | Transmission $F_{UL\_low}$-$F_{UL\_high}$ | Reception $F_{DL\_low}$-$F_{DL\_high}$ | Duplex mode |
|---|---|---|---|---|
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5 MHz-457.5 MHz | HD |
| 41 | 41 | 2496 MHz-2690 MHz | 2496 MHz-2690 MHz | HD |

Physical channels used for the side link are described below.
PSSCH (Physical Sidelink Shared Channel)
PSCCH (Physical Sidelink Control Channel)
PSDCH (Physical Sidelink Discovery Channel)
PSBCH (Physical Sidelink Broadcast Channel)
Further, physical signals used for the sidelink are described below.
Demodulation Reference signal (DMRS)
Sidelink Synchronization signal (SLSS)
The SLSS includes a primary SLSS (PSLSS) and a secondary SLSS (SSLSS).

Figure 10:
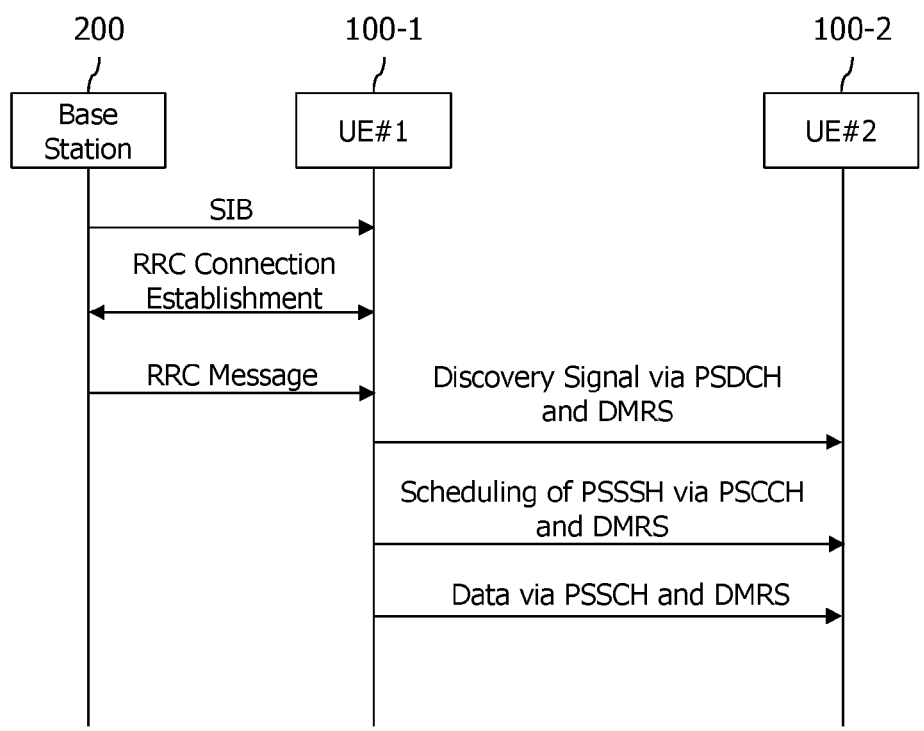
FIG. 10 illustrates an example of D2D communication or ProSe communication between UE#1 and UE#2 illustrated in FIG. 9.

FIG. 10 illustrates an example of D2D communication or ProSe communication between UE#1 and UE#2 illustrated in FIG. 9.

Referring to FIG. 10, the base station 200 broadcasts a system information block (SIB) into the cell.

The SIB may include information on a resource pool associated with the D2D communication. The information on the resource pool associated with the D2D communication may be divided into SIB type 18 and SIB type 19.

The SIB type 18 may include resource configuration information for the D2D communication. In addition, the SIB type 19 may include resource configuration information associated with a D2D discovery.

The SIB type 19 includes discSyncConfig as below.

TABLE 6

| | SIB type 19 |
|---|---|
| discSyncConfig | Represents a configuration regarding whether the UE is permitted to receive or transmit synchronization information. When the base station (E-UTRAN) makes the UE transmit the synchronization information by using dedicated signaling, the base station (E-UTRAN) may configure discSyncConfig. |

The discSyncConfig includes SL-SyncConfig. The SL-SyncConfig includes configuration information for receiving the SLSS and transmitting the SLSS as shown in a table given below.

TABLE 7

| | SL-SyncConfig field description |
|---|---|
| discSyncWindow | Called even a searching window. Represents a synchronization window in which the UE expects the SLSS. A value may be set to w1 or w2. The w1 value represents 5 milliseconds and the w2 value corresponds to a length acquired by the normal CP by 2. |
| syncTxPeriodic | Represents whether the UE transmits the SLSS once within one period of a discovery signal transmitted thereby or periodically (for example, every 40 ms). In the case of the periodic transmission, the UE further transmits MasterInformationBlock-SL. |
| syncTxThreshIC | Represents a threshold used when the UE is positioned in coverage. When an RSRP value measured for a counterpart UE (recognized like the cell) selected for the sidelink communication is smaller than the threshold, the UE may transmit the SLSS for the sidelink communication with the counterpart UE. |
| txParameters | Includes a parameter regarding a configuration for transmission. |

Meanwhile, the UE#1 100-1 positioned in the coverage of the base station 200 establishes the RRC connection with the base station.

In addition, the UE#1 100-1 receives an RRC message, for example, an RRC Connection Reconfiguration message from the base station 200. The RRC message includes a discovery configuration (hereinafter, referred to as discConfig). The discConfig includes configuration information for a discover resource pool (hereinafter, referred to as DiscResourcePool) for the discovery. The DiscResourcePool includes information shown in a table given below.

TABLE 8

| | DiscResourcePool |
|---|---|
| discPeriod | May be written even as a discovery period and as a period of a resource assigned in the cell for transmitting/receiving the discovery message may be called a PDSCH period. A value may be rf32, rf64, rf128, rf256, rf512, rf1024, or the like. The value represents the number of radio frames. That is, when the value is rf32, the rf32 represents 32 radio frames. |
| numRepetition | Represents the number of times when subframeBitmap for mapping to a subframe generated within discPeriod is repeated. The base station configures numRepetition and subframeBitmap so that the mapped subframe does not exceed the discPeriod. |
| TF-ResourceConfig | Designates a set of time/frequency resources used for the sidelink communication. |

The TF-ResourceConfig includes information shown in a table given below.

TABLE 9

```
SL-TF-ResourceConfig-r12 ::=    SEQUENCE {
    prb-Num-r12                 INTEGER (1..100),
    prb-Start-r12               INTEGER (0..99),
    prb-End-r12                 INTEGER (0..99),
    offsetIndicator-r12         SL-OffsetIndicator-r12,
    subframeBitmap-r12          SubframeBitmapSL-r12
}
```

The SubframeBitmapSL is shown in a table given below.

TABLE 10

| SubframeBitmapSL | May be written even as discoverySubframeBitmap and designates a subframe bitmap representing a resource used for the sidelink. A value may be designated as bs4, bs8, bs12, bs16, bs30, bs40, bs40, and the like. For example, the bs40 value means a bit string length 40. |
|---|---|

The SL-OffsetIndicator includes information shown in a table given below.

TABLE 11

| SL-OffsetIndicator | May be written even as discoveryOffsetIndicator and represents an offset of a first period of the resource pool within an SFN cycle. |
|---|---|
| SL-OffsetIndicatorSync | May be written even as SyncOffsetIndicator and represents a relationship between SFNs including a synchronization resource and the subframes according to an equation. (SFN*10+ Subframe Number) mod 40 = SL-OffsetIndicatorSync. |

Meanwhile, the UE#1 100-1 may transmit the discovery signal through the PDSCH in order to discover whether an appropriate UE is present therearound or notify the presence of the UE#1 100-1 for the D2D communication or ProSe communication.

Meanwhile, further, the UE#1 100-1 may transmit scheduling assignment (SA) through the PSCCH. In addition, the UE#1 100-1 may transmit the PSSCH including data based on the scheduling assignment (SA).

Figure 11:
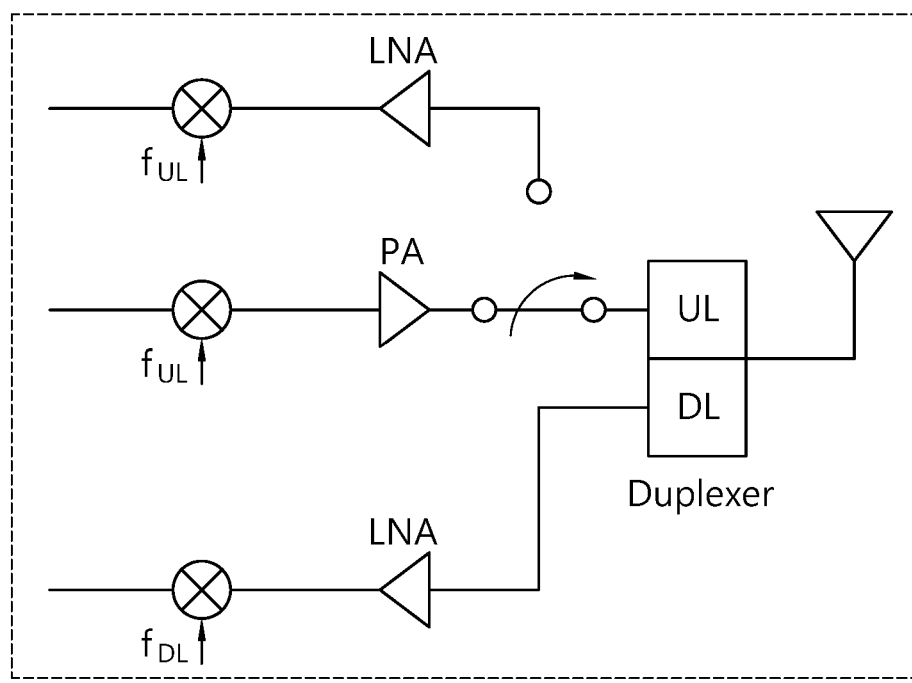
FIG. 11 illustrates an RF structure of a UE for the D2D communication or the ProSe communication.

FIG. 11 illustrates an RF structure of a UE for the D2D communication or the ProSe communication.

As known with reference to Tables 1 and 5 given above, the frequency band used for the D2D communication or ProSe communication is an uplink frequency band used for communication (hereinafter, referred to as WAN communication) between the UE and the base station. Accordingly, as illustrated in FIG. 9, for the D2D communication or ProSe communication, in the RF structure of the UE, a separate RF chain for the D2D communication is added to the uplink frequency band. In addition, a switch is added to the separate RF chain. When an uplink transmission signal for the WAN communication is transmitted, the switch connects an output of a power amplifier (PA) which is illustrated toward an antenna (that is, connected through a duplexer). Similarly, when a transmission signal for the D2D communication or ProSe communication is transmitted, the switch connects the output of the power amplifier (PA) which is illustrated toward the antenna. However, when a reception signal for the D2D communication or ProSe communication is transmitted, the switch connects a reception signal from the duplexer to a low noise amplifier.

As described above, as the switch operates, transmission of the WAN communication is turned on/off. Similarly, reception of the D2D communication or ProSe communication is also turned on/off.

However, there is a problem in that the WAN communication is interrupted due to the on/off.

<Disclosure of the Present Specification>

Accordingly, disclosures of the present specification provide a method for solve the above problems. In detail, the disclosures of the present specification review a scenario where interruption of WAN communication by D2D communication (or ProSe communication) and interruption of D2D communication (or ProSe communication) by WAN communication occur, and discus how long the interruption is allowed FIG. 12 illustrates a example where a macro cell is operated as a Pcell, and a s mall cell is operated as an Scell.

Figure 12:
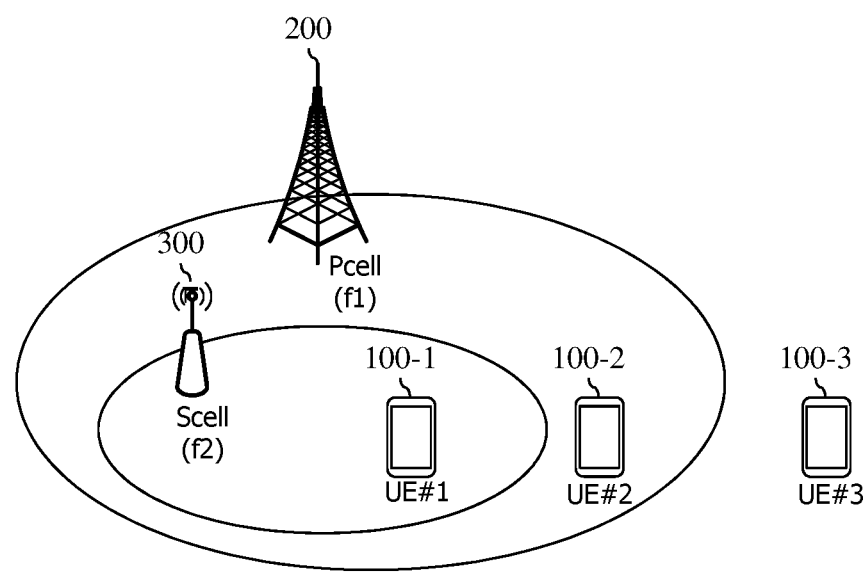
FIG. 12 illustrates an example where a macro cell is operated as a Pcell, and a small cell is operated as an Scell.

As shown in FIG. 12, a macro cell 20 operating as the Pcell is operated at a carrier frequency f1, and a small cell 300 operating as the Scell is operated at a carrier frequency f2.

In this case, UE#1 (100-1) is located in a coverage (IC: In Coverage) of the small cell 300 operating as the Scell. UE#2 (100-2) is located in a coverage (IC: In Coverage) of the macro cell 200 operating as the Pcell. UE#3 (100-3) is located out of the coverage (OoC: Out of Coverage).

In this case, the D2C communication may be performed at a carrier frequency f1 of the Pcell, and may be performed at a carrier frequency f2 of the Scell, or may be performed at a carrier frequency f3 of a non-serving cell.

Situations of each UE shown in FIG. 12 is as follows.

TABLE 12

| | IC or OoC (per UE | per carrier) | | |
|---|---|---|---|
| Frequency | UE#1 | UE#2 | UE#3 |
| Pcell($f_{1UL}$) | IC | IC | IC | IC | OoC | OoC |
| Scell($f_{2UL}$) | IC | IC | IC | OoC | OoC | OoC |
| Non-serving cell($f_{3UL}$) | IC | OoC | IC | OoC | OoC | OoC |

With terminology per UE, IC and OoC condition is same for 3 UEs (e.g., UE#1, UE#2 and UE#3). Because In-coverage and Out of coverage of UE can be defined mainly by only coverage of serving cell including Pcell and Scell.

With terminology per carrier, IC and OoC are different depending on carrier applied for D2D. For example, in case of D2D carrier on Pcell, UE#1 and UE#2 are in IC and UE#3 is in OoC. In case of D2D carrier on Scell, UE#1 is in IC and UE#2 and UE#3 are in OoC. In case of D2D carrier on non-serving cell, UE#1, UE#2 and UE#3 are in OoC. This terminology per carrier seems to be more complex than that per UE however it is useful to understand easily the interruption for IC and OoC in multi carrier.

Interruption of RRM in multi carrier is evaluated with two RF receiving type, i.e., shared RF Rx chain and dedicated RF Rx chain. So far, a shared RF Rx chain is available just for IC and a dedicated RF Rx chain is available for both IC and OoC.

1. Shared RF Rx Chain (for IC)

1-1. D2D Discovery on Pcell (UE#1, UE#2)

1-1-1. For UE#1

When operating during DRX and idle, any interruption does not occur to both Pcell and Scell.

When operating during connected mode, interruption does not occur to Pcell but occurs to activated Scell.

1-1-2. For UE#2

During D2D operation, any interruption does not occur to both Pcell and Scell.

1-2. D2D Discovery on Scell (UE#1, UE#2)

1-2-1. For UE#1

When operating during DRX and idle, any interruption does not occur to both Pcell and Scell.

When operating during activated Scell, interruption occurs to only Pcell.

When operating during deactivated Scell, interruption occurs to only Pcell.

1-2-2. For UE#2

When operating during DRX and idle, any interruption does not occur to both Pcell and Scell.

When operating during connected mode, interruption occurs to Pcell but does not occur to Scell.

2. Dedicated RF Rx Chain (for IC & OoC)

2-1. D2D Discovery on Pcell (UE#1, UE#2 and UE#3)

2-1-1. For UE#1

When operating during DRX and idle, any interruption does not occur to both Pcell and Scell.

When operating during connected mode, interruption occurs to both Pcell and activated Scell.

2-1-2. For UE#2

When operating during DRX and idle, any interruption does not occur to both Pcell and Scell.

When operating during connected mode, interruption occurs to Pcell but does not occur to Scell.

2-1-3. For UE#3

Any interruption does not occur to both Pcell and Scell. UE needs to perform cell search and access.

2-2. D2D Discovery on Scell (UE#1, UE#2 and UE#3)

2-2-1. For UE#1

When operating during DRX and idle, any interruption does not occur to both Pcell and Scell.

When operating during activated Scell, interruption occurs to both Pcell and activated Scell.

When operating during deactivated Scell, interruption occurs to only Pcell.

2-2-2. For UE#2

When operating during DRX and idle, any interruption does not occur to both Pcell and Scell.

When operating during connected mode, interruption occurs to Pcell but does not occur to Scell.

2-2-3. For UE#3

Any interruption does not occur to both Pcell and Scell. UE#3 needs to perform cell search and access.

2-3. D2D Discovery on Non-serving cell frequency (UE#1, UE#2 and UE#3)

2-3-1. For UE#1

When operating during DRX and idle, any interruption does not occur to both Pcell and Scell.

When operating during connected mode, interruption occurs to both Pcell and activated Scell.

2-3-2. For UE#2

When operating during DRX and idle, any interruption does not occur to both Pcell and Scell.

When operating during connected mode, interruption occurs to Pcell but does not occur to Scell.

2-3-3. For UE#3

Any interruption does not occur to both Pcell and Scell. UE needs to perform cell search and access.

The above contents are illustrated in a following table 13.

The following table 13 illustrates that interruption occurs by taking into consideration multi-carrier and an RF structure of UE.

TABLE 13

| | | Interruption on Pcell/Scell during D2D discovery | | | | | | | |
|---|---|---|---|---|---|---|---|---|---|
| D2D operation | | on Pcell IC: UE#1 and UE#2, OoC: UE#3 | | | on Scell IC: UE#1, OoC: UE#2 and UE#3 | | | on non-serving cell OoC: UE#1, UE#2, and UE#3 | | |
| Pcell/Scell | | Connected | | | Connected | | | Connected | | |
| condition Type of RF Rx | | DRX/ Idle | Scell activated | Scell deactivated | DRX/ Idle | Scell activated | Scell deactivated | DRX/ Idle | Scell activated | Scell deactivated |
| Shared RF Rx | UE#1 | (X/X) | (X/O) | (X/X) | (X/X) | (O/X) | (O/X) | — | — | — |
| | UE#2 | (X/X) | (X/X) | (X/X) | (X/X) | (O/X) | (O/X) | — | — | — |
| | UE3 | — | — | — | — | — | — | — | — | — |
| Dedicated RF Rx | UE#1 | (X/X) | (O/O) | (O/X) | (X/X) | (O/O) | (O/X) | (X/X) | (O/O) | (O/X) |
| | UE#2 | (X/X) | (O/X) | (O/X) | (X/X) | (O/X) | (O/X) | (X/X) | (O/X) | (O/X) |
| | UE#3 | (X/X) | (X/X) | (X/X) | (X/X) | (X/X) | (X/X) | (X/X) | (X/X) | (X/X) |

In the table 13, the X represents that interruption does not occur, and the O represents that the interruption occurs. In the table 13, the shared RF Rx represents that one RF chain is shared for D2D reception and WAN reception. The dedicated RF Rx represents that an RF chain for the D2D reception and an RF chain for the WAN reception are individually realized.

As illustrated in the table 13, the interruption occurs. In this case, since the D2D communication is not generally sensitive to delay like SNS, the D2D communication interrupts due to the WAN communication, which does not cause a great problem. Meanwhile, since delay is not allowed in the WAN communication like a voice call, if the D2D communication interrupts due to the D2D communication, it may be a problem.

Accordingly, the present specification suggests interruption in a multi-carrier environment as follows.

When a UE capable of ProSe Direct Communication and/or ProSe Direct Discovery is configured with DRX and DRX is in use, interruptions are not allowed while the onDurationTimer is running.

1. Interruptions at Prose Direct Discovery Configuration

A UE capable of ProSe Direct Discovery may indicate its interest (initiation or termination) in ProSe Direct Discovery to the connected eNodeB. The indication may be transmitted via a Sidelink UE Information message.

The UE is allowed an interruption of up to 1 subframe on PCell during the RRC reconfiguration procedure that includes the ProSe Direct Discovery configuration message, i.e., sl-DiscConfig. This interruption is for both uplink and downlink of PCell.

2. Interruptions at Prose Direct Communication Configuration

A UE capable of ProSe Direct Communication may indicate its interest (initiation or termination) in ProSe Direct Communication to the connected eNodeB. The indication may be transmitted via a Sidelink UE Information message.

The UE is allowed an interruption of up to 1 subframe on PCell during the RRC reconfiguration procedure that includes the ProSe Direct Communication configuration message, i.e., sl-CommConfig. This interruption is for both uplink and downlink of PCell.

3. Interruptions During Performing Prose Direct Discovery

The UE is allowed an interruption of up to 1 subframe that is N subframes before and after a UL subframe configured for ProSe Direct Discovery by the eNodeB.

The value of N is ceil(w1/1 ms) subframes when the parameter discSyncWindow[2] is configured with value w1 in the sidelink synchronization resource configuration associated with the ProSe Direct Discovery subframe.

The value of N is 1 subframe otherwise.

The interruptions are for both uplink and downlink of PCell or/and activated SCell(s). The interruption for the ProSe UE may occur:

for activated SCell(s) while switching reception between ProSe Direct Discovery and the PCell, or for PCell and another activated SCell(s) while switching reception between ProSe Direct Discovery and the SCell, or for PCell and activated SCell(s) while switching a receiver chain ON/OFF for ProSe Direct Discovery if the UE has a dedicated receiver chain for discovery.

The aforementioned embodiments of the present invention can be implemented through various means. For example, the embodiments of the present invention can be implemented in hardware, firmware, software, combinations thereof, etc. Details thereof will be described with reference to the drawing.

Figure 13:
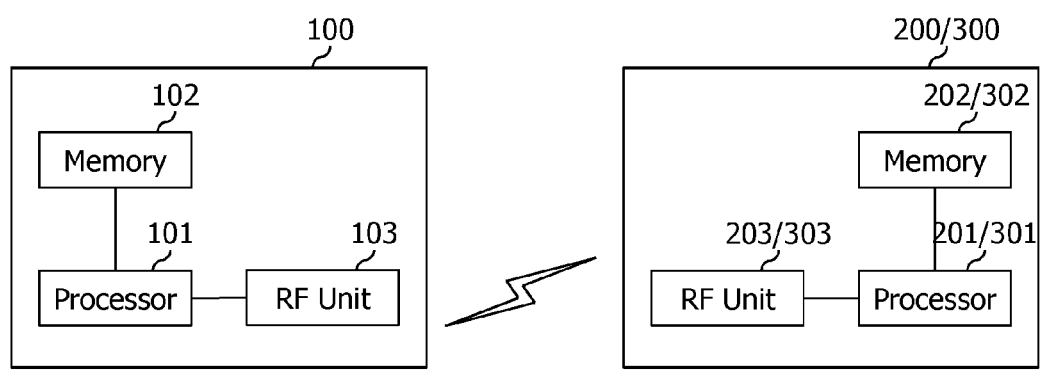
FIG. 13 is a block diagram of a wireless communication system according to a disclosure of the present specification.

FIG. 13 is a block diagram of a wireless communication system according to a disclosure of the present specification.

A BS 200/300 includes a processor 201/301, a memory 202/302, and a radio frequency (RF) unit 203/303. The memory 202/302 is coupled to the processor 201/301, and stores a variety of information for driving the processor 201/301. The RF unit 203/303 is coupled to the processor 201/301, and transmits and/or receives a radio signal. The processor 201/301 implements the proposed functions, procedures, and/or methods. In the aforementioned embodiment, an operation of the BS may be implemented by the processor 201/301

A UE 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a proximity service (ProSe), the method performed by a user equipment (UE) and comprising:

performing, by the UE configured with a primary cell (Pcell) and a secondary cell (Scell), a switching between the ProSe and a cellular service with at least one of the Pcell and the Scell;

transceiving a ProSe discovery signal with at least one or more adjacent UEs after performing a switching from the cellular service to the ProSe service; and transceiving a signal with the at least one of the Pcell and the Scell after performing a switching from the ProSe service to the cellular service, wherein the UE is allowed an interruption of up to one subframe before and after an uplink (UL) subframe configured for transmitting the ProSe discovery signal.

2. The method of claim 1, wherein the interruption occurs with respect to the Scell while performing the switching between the ProSe and the cellular service with the Pcell.

3. The method of claim 1, wherein the interruption occurs with respect to the Pcell and another S cell while performing the switching between the ProSe and the cellular service with the Scell.

4. The method of claim 1, wherein if the UE includes a dedicated radio frequency (RF) chain for the ProSe discovery signal, the interruption occurs with respect to the Pcell and the Scell.

5. A user equipment (UE) for performing a proximity service (ProSe), the UE comprising:

a transceiver configured with a primary cell (Pcell) and a secondary cell (Scell); and a processor configured to:

perform a switching between the ProSe and a cellular service with at least one of the Pcell and the Scell;

transceive a ProSe discovery signal with at least one or more adjacent UEs after performing a switching from the cellular service to the ProSe service; and transceive a signal with the at least one of the Pcell and the Scell after performing a switching from the ProSe service to the cellular service, wherein the UE is allowed an interruption of up to one subframe before and after an uplink (UL) subframe configured for transmitting the ProSe discovery signal.

6. The UE of claim 5, wherein
the interruption occurs with respect to the Scell while performing the switching between the ProSe and the cellular service with the Pcell.
7. The UE of claim 5, wherein
the interruption occurs with respect to the Pcell and another Scell while performing the switching between the ProSe and the cellular service with the Scell.
8. The UE of claim 5, wherein
if the UE includes a dedicated radio frequency (RF) chain for the ProSe discovery signal, the interruption occurs with respect to the Pcell and the Scell.

\* \* \* \* \*